United States Patent Office 3,324,463
Patented June 6, 1967

3,324,463
TIME INTERVAL MEASURING AND RECORDING ARRANGEMENT
Thomas R. Long, Bridgewater Township, Somerset County, N.J., assignor to Bell Telephone Laboratories, Incorporated, New York, N.Y., a corporation of New York
Filed Oct. 7, 1963, Ser. No. 314,321
17 Claims. (Cl. 340—174)

This invention relates to electronic timing circuits and, more specifically, to an arrangement which accurately measures and automatically records the time at which events of interest occur.

A plurality of electronic timing circuits are well known in the art and described, for example, in vol. 20 of the Radiation Laboratory Series, entitled, "Electronic Time Measurements," edited by B. Chance et al., copyrighted by McGraw-Hill in 1949. One typical prior art arrangement, employed to compute the time interval between two sequentially occurring events, comprises a fixed frequency pulse source which is gated on and off, respectively, responsive to the occurrence of the first and second events. By counting the number of pulses supplied by the pulse source, the time interval may readily be determined. A second relatively common time measuring embodiment utilizes a single sinusoidal signal and a phase detector. In such an arrangement the timing information is derived from the phase differential undergone by the sinusoid between the times when the relevant events transpire.

However, the above and other prior art timing arrangements become increasingly complex and difficult to fabricate as the time intervals to be measured become relatively small. Moreover, if permanent storage of the timing information is desired, ancillary memory elements must usually be provided. Further, the timing information supplied by prior art embodiments is ordinarily analog in nature, and analog-to-digital converters must be employed if binary encoded output signals are required.

It is therefore an object of the present invention to provide an improved electronic timing arrangement.

More specifically, an object of the present invention is the provision of a circuit arrangement which accurately measures and records the times when any desired number of events of interest occur.

Another object of the present invention is a time measuring arrangement which automatically records timing information in binary form suitable for data processing.

Still another object of the present invention is the provision of an electronic time measuring arrangement capable of measuring very short periods of time with high resolution.

Yet another object of the present invention is the provision of a time measuring and recording arrangement which is highly reliable, and which may be easily and inexpensively constructed.

These and other objects of the present invention are realized in a specific, illustrative time interval measuring and recording arrangement which includes a set of thin film ferromagnetic storage elements. The film elements each have their easy axes of magnetization coupled to a plurality of output terminals included on a harmonic generator which supplies thereto a fundamental frequency oscillation and a plurality of even harmonics thereof. A biasing current source is coupled to the hard magnetization axes of the thin film elements.

When an event of interest occurs, the biasing source is de-energized. Responsive thereto, the magnetization of each film spot rotates to a selected orientation along the easy film axis, which orientation is determined by the instantaneous polarity of the associated harmonic signal. The storage pattern in the film devices uniquely identifies the time relative to the start of the fundamental frequency oscillation when the event transpired, to an accuracy of one-half the period of the highest harmonic. If it is desired to time a plurality of sequentially-occurring events, additional sets of film elements are employed.

It is thus a feature of the present invention that a time interval measuring arrangement employ a harmonic generator which supplies a fundamental frequency oscillation, and a plurality of even harmonics thereof, to quantize a time interval.

It is another feature of the present invention that a time measuring arrangement include a plurality of thin film magnetic elements having the easy axes thereof coupled to sinusoidal magnetizing forces characterized by a fundamental frequency and a plurality of even harmonics thereof, and that the arrangement further include a normally energized biasing source coupled to the hard axes of the thin film elements, and an event detector for de-energizing the bias source.

A complete understanding of the present invention and of the above and other features, advantages and variations thereof, may be gained from a consideration of the following detailed description of an illustrative embodiment thereof presented hereinbelow in conjunction with the accompanying drawing, in which.

Figure 1:
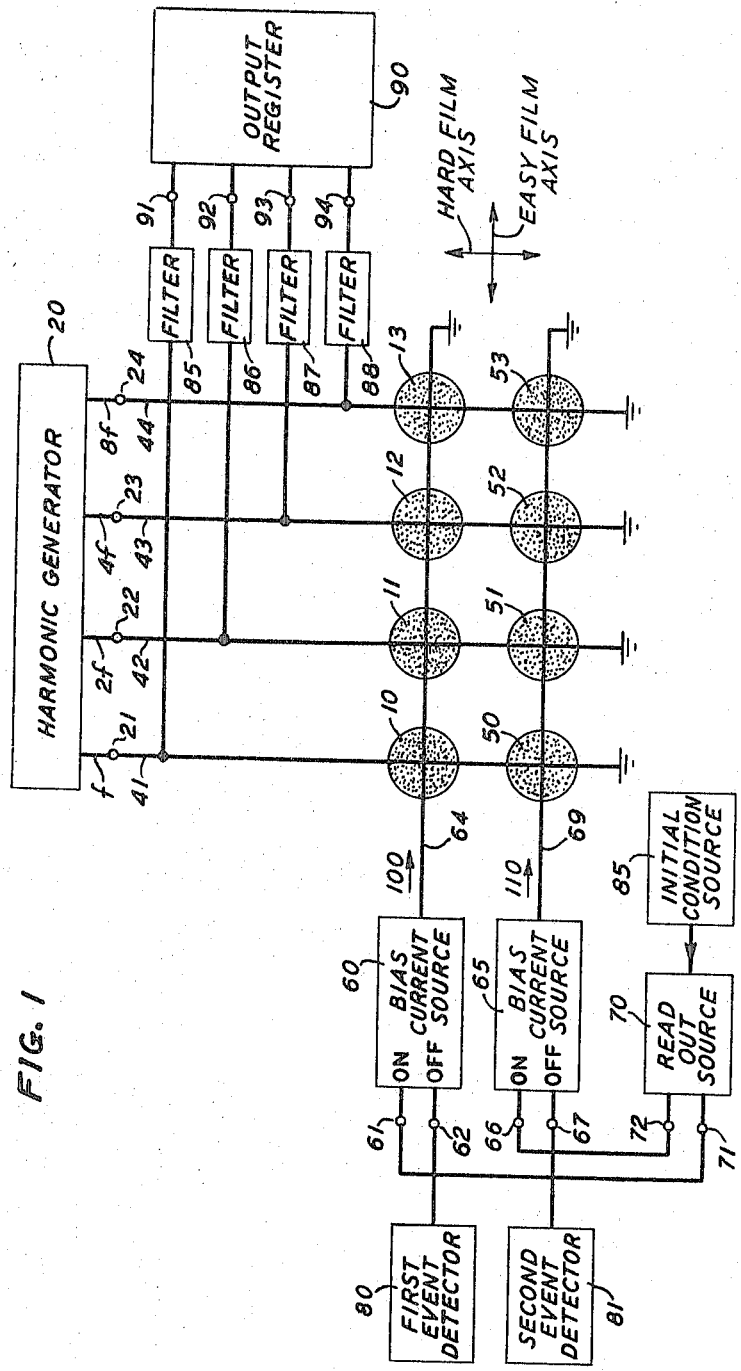
FIG. 1 is a diagram of an illustrative time measuring and recording arrangement which embodies the principles of the present invention.

Referring now to FIG. 1, there is shown a specific illustrative time interval measuring and recording arrangement which includes a first set of ferromagnetic thin film elements 10 through 13 and a second set of film elements 50 through 53. A plurality of signal windings 41 through 44 are respectively coupled to the easy magnetization axes of the first set of film elements 10 through 13 and also to the easy axes of the second set of elements 50 through 53. The windings 41 through 44 have one end portion thereof grounded with the other winding end portions being respectively connected to a plurality of output terminals 21 through 24 which are included on a harmonic generator 20. The generator 20 supplies a fundamental frequency sinusoidal current signal to the output terminal 21, and further supplies currents characterized by the second, fourth, and eighth harmonic frequencies of the fundamental sinusoid to the remaining output terminals 22 through 24 in that order. The currents supplied to the terminals 21 through 24 are respectively illustrated in the upper four curves included in FIG. 2.

Figure 2:
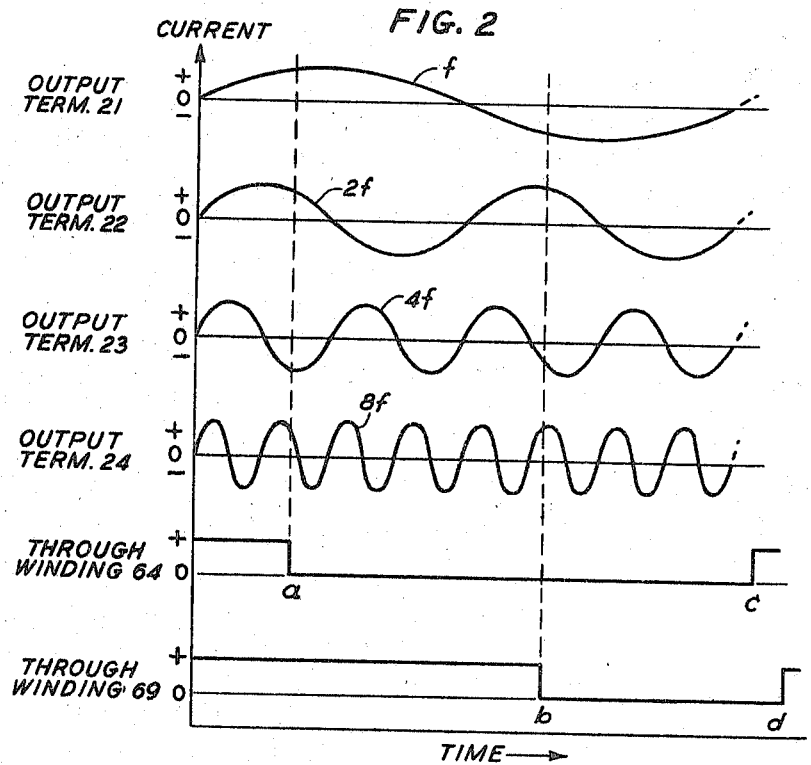
FIG. 2 is a timing diagram illustrating a first set of currents associated with selected circuit elements illustrated in FIG. 1.

By respectively assigning the binary designations "0" and "1" to the positive and negative polarity of each sinusoid supplied by the generator 20, it is noted that the time interval corresponding to each half cycle of the eighth harmonic current shown in the fourth curve in FIG. 2 is identified by a unique binary word, as illustrated in Table I following:

TABLE I

| Half Cycle of the Eight Harmonic Current | Polarity of the Fundamental Sinusoid | Polarity of the Second Harmonic | Polarity of the Fourth Harmonic | Polarity of the Eigth Harmonic |
|---|---|---|---|---|
| First | 0 | 0 | 0 | 0 |
| Second | 0 | 0 | 0 | 1 |
| Third | 0 | 0 | 1 | 0 |
| Fourth | 0 | 0 | 1 | 1 |
| Fifth | 0 | 1 | 0 | 0 |
| Sixth | 0 | 1 | 0 | 1 |
| Seventh | 0 | 1 | 1 | 0 |
| Eigth | 0 | 1 | 1 | 1 |
| Ninth | 1 | 0 | 0 | 0 |
| Tenth | 1 | 0 | 0 | 1 |
| Eleventh | 1 | 0 | 1 | 0 |
| Twelfth | 1 | 0 | 1 | 1 |
| Thirteenth | 1 | 1 | 0 | 0 |
| Fourteenth | 1 | 1 | 0 | 1 |
| Fifteenth | 1 | 1 | 1 | 0 |
| Sixteenth | 1 | 1 | 1 | 1 |

It is noted that the above encoding comprises a straight binary counting code, with the most significant digit being in the left-hand column. Hence, for example, the binary word "1001," which has a decimal equivalent of "9," identifies the time interval coincident with the *tenth* half cycle of the eighth harmonic signal (since the first half cycle is represented by a decimal "0").

Two bias current sources 60 and 65 are included in the FIG. 1 arrangement. The source 60 is coupled by a first bias winding 64 to the hard axis of each of the first set of thin film elements 10 through 13. Similarly, the bias source 65 is coupled to the hard magnetization axis of each of the thin film elements 50 through 53 by a second bias winding 69. The bias sources 60 and 65 each include an ON input terminal 61 and 66, respectively, and also an OFF input terminal 62 and 67, respectively.

The sources 60 and 65 respectively supply direct currents in the direction of the vectors 100 and 110 shown in FIG. 1 to the associated bias windings 64 and 69 when the ON terminals 61 and 66 thereof have been last activated. When the OFF terminals 62 and 67 thereof have been last supplied with an input signal, the sources 60 and 65 do not supply currents to the associated biasing windings 64 and 69.

First and second event detectors 80 and 81 are respectively connected to the OFF input terminals 62 and 67 included on the biasing sources 60 and 65. The event detectors 80 and 81 are employed to supply a voltage increment to the OFF terminal of the associated source upon the occurrence of an event to which they are responsive. In addition, a read out source 70 has two output terminals 71 and 72 thereon respectively connected to the ON terminals 61 and 66 included on the biasing sources 60 and 65. The source 70 sequentially supplies voltage signals to the output terminals 71 and 72 included thereon in that order. Finally, an output register 90 has four input terminals 91 through 94 thereon respectively connected to the signal windings 41 through 44 via one of a plurality of filter means 85 through 88. Each of the filters 85 through 88 is adapted to present an extremely high impedance at the sinusoidal frequency associated with the signal winding connected thereto while presenting a low impedance to output pulse information.

With the above organization in mind, an illustrative sequence of circuit operation for the FIG. 1 time measuring and recording arrangement will now be described. The initial condition for the magnetization vectors symbolizing the instantaneous magnetic states of the thin film elements 10 through 13 and 50 through 53 is in a vertically up orientation along the hard magnetization axes. This initial condition is achieved by an initial condition source 83 included in the FIG. 1 arrangement directing the read out source 70 to supply pulses to the output terminals 71 and 72 thereon. These pulses supplied by the source 70 activate the bias sources 60 and 65, thereby energizing the associated biasing windings 64 and 69 with direct currents in the direction indicated by the vectors 100 and 110. The requisite initial current conditions for the windings 64 and 69 are respectively shown in the lower two curves included in FIG. 2 for the interval preceding time *a* shown therein.

Assume now that an event occurs at time *a* to which the first event detector 80 is responsive. This event may advantageously comprise a "start" signal to establish a time reference or, alternatively, an actual event of interest. The detector 80 senses the event at time *a* and supplies a voltage pulse to the OFF input terminal 62 included on the biasing source 60. Responsive to this received input pulse, the source 60 de-energizes the biasing winding 64 connected thereto, as shown in the next-to-the-bottom curve included in FIG. 2 for the interval following time *a*. When the biasing magnetizing force is removed from the hard axis direction of each of the first set of thin film elements 10 through 13 by the de-energization of the biasing winding 64, the magnetization vector in each of the film elements 10 through 13 rotates from its former orientation along the hard axis to now reside along the easy axis of magnetization of the corresponding film element. The particular directions along the easy axis to which the magnetization vectors respectively rotate are dependent upon the instantaneous polarities of the magnetizing forces supplied along the easy axis, which are, in turn, solely a function of the instantaneous polarities of the sinusoidal currents supplied to the associated signal windings 41 through 44. With the specific winding polarities employed in the FIG. 1 timing arrangement, a positive sinusoidal signal current flowing downwards through a signal winding will cause the associated magnetization vector to rotate to a left-to-right orientation along the easy axis, while an upward-flowing, negative sinusoidal current will give rise to a right-to-left easy axis orientation. This tipping, or rotating mode of operation is unique to thin film elements, and has been discussed at great length in the literature. See, for example, "Theoretical Hysteresis Loops of Thin Magnetic Films," by H. J. Oguey in the June 1960 issue of the Proceedings of the I.R.E.

At the time *a* shown in FIG. 2, it may be observed that the fundamental frequency oscillation and the second and eighth harmonic sinusoidal signal currents, respectively supplied to the windings 41, 42 and 44, have a positive value whereas the fourth harmonic signal supplied to the winding 43 has a negative value. Hence, when the hard axis bias is removed from the thin film elements 10 through 13 at time *a*, the magnetization vectors in the film elements 10, 11 and 13 will rotate to a left-to-right orientation along the easy axis of these elements, while the vector in the film element 12 will reside in a right-to-left easy axis polarity. Thus, as will become more apparent from the following discussion, digital-type information which specifically identifies the time interval corresponding to the particular eighth harmonic half cycle which includes the time *a* is stored in the film elements 10 through 13, which information is represented by the selective pattern of easy axis magnetic conditions for these film devices.

Assume now that a second event of interest occurs at the time *b* shown in the lower curve included in FIG. 2. Responsive thereto the second event detector 81 supplies a signal to the OFF input terminal 67 included on the source 65. Upon receiving a signal from the detector 81 at time *b*, the source 65 becomes deactivated and no current is supplied to the associated biasing winding 69, as shown in the lower graph of FIG. 2. As may be observed in the upper four graphs included in FIG. 2, the fundamental frequency oscillation and the fourth harmonic sinusoid have negative values at time $b$, while the second and eighth harmonic signals have positive values. Hence, when the magnetization vectors included in the film elements 50 through 53 rotate toward the easy magnetization axis responsive to the de-energization of the biasing winding 69, the film devices 50 and 52 reside in a right-to-left orientation along the easy axis, and the film elements 51 and 53 reside in a left-to-right polarity.

When the timing information stored in the film devices 10 through 13 and 50 through 53 is desired, the read out source 70 first supplies a signal to the output terminal 71 at time $c$, and later supplies an output signal to the terminal 72 at time $d$. The times $c$ and $d$ are respectively shown in the bottom two curves included in FIG. 2. When the biasing source 60 receives the signal supplied thereto by the source 70 at the time $c$, the source 60 once again supplies a biasing current to the associated biasing winding 64, as shown in the next-to-the-bottom curve included in FIG. 2. Responsive to the applied magnetizing force supplied thereto by the energized biasing winding 64, the magnetization vectors included in the first set of film spots 10 through 13 each rotate upwards to a vertical, hard direction magnetization axis. The upward rotation of the magnetization in the films 10, 11 and 13, which started from a left-to-right easy axis orientation, induces negative voltage pulses in the associated signal windings 41, 42 and 44. These negative signals are transmitted via the filter means 85, 86 and 88 to output terminals 91, 92 and 94 included on the output register 90. As noted hereinabove, the filter means 85 through 88 inhibit the associated sinusoidal currents from passing therethrough to the output register 90, while allowing the passage of the output pulse information.

On the other hand, as the magnetic rotation of the film element 12 started from a right-to-left easy axis polarity prior to the time $c$, a positive signal is induced in the associated signal winding 43 by the magnetic vector rotation occurring the element 12. This positive output pulse is coupled from the winding 43 to the output register terminal 93 via the filter means 87. Hence, adopting the binary terminology that a positive output signal is a binary "1" and a negative signal is a binary "0," the binary word "0010" is supplied to the output register terminals 91 through 94 at time $c$. It is noted that this binary word has the decimal equivalent "2," hence specifying that the event transpiring at time $a$ occurred during the time interval corresponding to the third half cycle of the highest, or eighth harmonic sinusoid, as indicated by Table I supra.

Responsive to the read-out pulse supplied by the source 70 at time $d$, the bias current source 65 at this time energizes the bias winding 69, as shown in the bottom curve of FIG. 2. The winding 69 thereby constrains the magnetization vectors in the second set of film spots 50 through 53 to rotate to their upward, hard direction axes. Responsive thereto, positive pulses are supplied to the output terminals 91 and 93 since the film spots 50 and 52 resided in a right-to-left easy axis orientation prior to the time $d$. In a similar manner, negative pulses are supplied to the output terminals 92 and 94. Employing the convention adapted hereinabove, the binary word "1010" is supplied to the register terminals 91 through 94. This word has a decimal equivalent of "10" which, as may be observed from Table I supra, indicates that the time $b$ occurred during the time interval coincident with the eleventh half cycle of the eighth harmonic signal.

Following the time $d$, the FIG. 1 arrangement is reset to the requisite initial condition described above, and is ready to measure and record the times at which two new events of interest are detected by the event detectors 80 and 81. Thus, the FIG. 1 arrangement has been shown to measure and record the times, relative to the beginning of a cycle of the fundamental frequency oscillation, at which two events have occurred.

It should be observed that the FIG. 1 time measuring arrangement has a maximum time error corresponding to the duration of one half cycle of the highest harmonic frequency employed. Hence, the FIG. 1 arrangement may be designed to measure time to any desired accuracy by simply employing a suitable number of harmonics. In general, if time is to be measured to an accuracy of within $\Delta$ time units, the highest harmonic frequency must be at least $1/2\Delta$. Hence, since thin films are operable to at least 1000 megacycles, the FIG. 1 arrangement may advantageously be designed to measure time to within 0.5 nanosecond.

Several things are noted at this point. First, the amplitude of the sinusoidal currents supplied by the harmonic generator 20 may advantageously be designed to be capable of effectively saturating the film elements 10 through 13 and 50 through 53 along their easy axes for almost the entirety of each half cycle of oscillation when the hard axis bias is removed. This would constrain the output signals supplied to the register 90 to be of a uniform amplitude. Alternatively, a like result would obtain if conventional limiters were interposed between the filters 85 through 88 and the corresponding register terminals 91 through 94.

Figure 3:
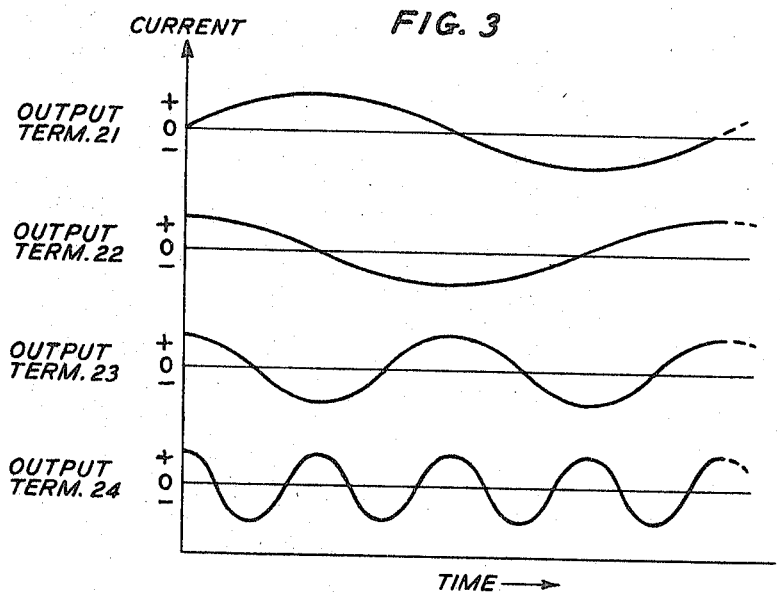
FIG. 3 is a timing diagram illustrating an alternative set of currents associated with selected circuit elements illustrated in FIG. 1.

Also, it is observed that a number of sinusoidal signal current combinations exist, in addition to the pattern shown in the upper four curves illustrated in FIG. 2, which may advantageously be supplied by the harmonic generator 20 to the output terminals 21 through 24 to uniquely quantize a time interval into sixteen equal portions (or any other desired number depending on the timing accuracy required). One such combination is illustrated in FIG. 3 wherein the output terminals 21 through 24 are respectively supplied with a fundamental frequency signal and a fundamental frequency, second harmonic and fourth harmonic signal each advanced by ninety degrees. By employing the binary convention adopted hereinabove regarding the FIG. 2 sinusoids, viz., a binary "0" and a binary "1" respectively correspond to a positive and negative sinusoidal polarity, the Gray-coded binary time interval representation shown in Table II infra results for each of the sixteen quarter cycles of the fourth harmonic current:

TABLE II

| Quarter Cycle of the Fourth Harmonic Current | Polarity of the Fundamental Sinusoid | Polarity of the Second Harmonic | Polarity of the Fourth Harmonic | Polarity of the Eighth Harmonic |
|---|---|---|---|---|
| First | 0 | 0 | 0 | 0 |
| Second | 0 | 0 | 0 | 1 |
| Third | 0 | 0 | 1 | 1 |
| Fourth | 0 | 0 | 1 | 0 |
| Fifth | 0 | 1 | 1 | 0 |
| Sixth | 0 | 1 | 1 | 1 |
| Seventh | 0 | 1 | 0 | 1 |
| Eighth | 0 | 1 | 0 | 0 |
| Ninth | 1 | 1 | 0 | 0 |
| Tenth | 1 | 1 | 0 | 1 |
| Eleventh | 1 | 1 | 1 | 1 |
| Twelfth | 1 | 1 | 1 | 0 |
| Thirteenth | 1 | 0 | 1 | 0 |
| Fourteenth | 1 | 0 | 1 | 1 |
| Fifteenth | 1 | 0 | 0 | 1 |
| Sixteenth | 1 | 0 | 0 | 0 |

The Gray code illustrated in Table II has the desirable property that only one of the four binary digits changes between any two contiguous time intervals. Hence, if an error occurs in any digit when an event is recorded, the error would correspond in time to the duration of only a single quarter cycle of the fourth harmonic signal. Also note that only one of the four sinusoids illustrated in FIG. 3 passes through zero at any single time. Hence, if an event occurs at or near any of these times, any error which results would be included in only a single digit which, as discussed above, amounts to a time error of only a quarter period of the fourth harmonic signal.

Summarizing, an illustrative time measuring and recording arrangement made in accordance with the principles of the present invention comprises a set of thin film magnetic storage elements. The film elements each have their easy axes of magnetization coupled to a plurality of output terminals included in a harmonic generator which supplies thereto a fundamental frequency oscillation and a plurality of even harmonics thereof. A biasing current source is coupled to the hard magnetization axes of the film elements.

When an event of interest occurs, the biasing source is de-energized. Responsive thereto, the magnetization vector in each film spot rotates to a selected orientation along the easy film axis, which orientation is determined by the instantaneous polarity of the associated harmonic signal. The storage pattern in the film devices uniquely identifies the time, relative to the start of the fundamental frequency oscillation, when the event transpired, to an accuracy of one-half the period of the highest harmonic. If it is desired to time a plurality of sequentially-occurring events, additional sets of film elements are employed.

It is to be understood that the above-described arrangements are only illustrative of the application of the principles of the present invention. Numerous other arrangements may be devised by those skilled in the art without departing from the spirit and scope of this invention. For example, while the FIG. 1 time measuring and recording arrangement was illustrated as being capable of processing two sequentially-occurring events, there is no limit to the capacity of such an arrangement. For each additional event to be monitored, an additional set of thin films along with an additional bias current source and event detector would simply be employed.

Also, note that the sole requirements on the signals supplied by the generator 20 are that they be bipolar and of the specified frequency relationship. Thus, bipolar square wave pulses supplied, for example, by a plurality of selected stages of a binary counter may advantageously be employed in the FIG. 1 arrangement.

Further, note that gating means may be employed in place of the filters 85 through 88 to pass only output information from the film elements to the register 90. The gating means would connect the signal windings 41 through 44 to the harmonic source output terminals 21 through 24 and the register input terminals 91 through 94, respectively, during the time measuring and read out portions of circuit operation.

What is claimed is:
1. In combination, a harmonic generating source for supplying output signals comprising a fundamental frequency bipolar oscillation and a plurality of harmonics thereof, a first plurality of magnetic thin film storage elements each including an easy and a hard axis of magnetization, and a plurality of windings each coupled to a different thin film element along its easy axis of magnetization and connected to said harmonic source, said source supplying each of said windings with a different one of said oscillations.

2. A combination as in claim 1 further comprising first biasing means coupled to each of said plurality of thin film elements along its hard magnetization axis.

3. A combination as in claim 2 further comprising an event detector connected to said biasing means for selectively de-energizing said biasing means.

4. A combination as in claim 3 further comprising an output register connected to each of said plurality of windings.

5. A combination as in claim 4 further comprising filter means serially interposed between said output register and said plurality of windings.

6. A combination as in claim 1 wherein said harmonic generating source comprises oscillating means for supplying a fundamental frequency signal and a plurality of even harmonics thereof, the frequencies of said harmonics following a geometric progression.

7. A combination as in claim 3 further comprising a second plurality of magnetic thin film storage elements each element including an easy and a hard axis of magnetization, each element included in said second film plurality being coupled along its easy magnetization axis to a different one of said plurality of windings, and second biasing means coupled to each of said second plurality of thin film magnetic elements along its hard axis of magnetization.

8. In combination, a harmonic generating source for supplying output signals comprising a fundamental frequency bipolar oscillation and a plurality of even harmonics thereof, an enabling means, a plurality of bistable storage elements each connected to said enabling means and to said harmonic generator, said harmonic generating source supplying each of said plurality of bistable elements with a different frequency oscillation, each of said bistable elements being responsive to an enabling signal supplied by said enabling means for residing in a first stable state when said associated harmonic signal is of a first polarity and for residing in a second stable state when said associated harmonic signal is of a second polarity.

9. A combination as in claim 8 wherein said enabling means includes an event detector.

10. A combination as in claim 9 further comprising read-out means connected to each of said bistable means for switching each of said bistable means to a like condition.

11. A combination as in claim 10 wherein each of said bistable means includes a magnetic thin film element each including a hard axis of magnetization and wherein said enabling means further includes a biasing current source connected to said event detector and coupled to each of said thin film elements along its hard axis of magnetization.

12. In combination, a harmonic generating source for supplying a plurality of differing oscillating signals, a first plurality of magnetic thin film storage elements each including an easy and a hard axis of magnetization, a plurality of windings each coupled to a different thin film element along its easy axis of magnetization and connected to said harmonic source, said source supplying each of said windings with a different one of said oscillations.

13. A combination as in claim 12 further comprising biasing means coupled to each of said first plurality of thin film elements along its hard magnetization axis.

14. A combination as in claim 13 further comprising an event detector connected to said biasing means for selectively de-energizing said biasing means.

15. A combination as in claim 14 further comprising an output register, and means connecting said output register to each of said plurality of windings.

16. A combination as in claim 12 wherein said harmonic generating source comprises means for supplying a plurality of binary Gray-coded bipolar signals.

17. In combination, a harmonic generating source for supplying output signals comprising a fundamental frequency bipolar oscillation and a plurality of even harmonics thereof, a plurality of magnetic thin film storage elements each including an easy and a hard axis of magnetization, and a plurality of windings each coupled to a different thin film element along its easy axis of magnetization and connected to said harmonic source, said source supplying each of said first windings with a different one of said oscillations.

No references cited.

BERNARD KONICK, *Primary Examiner.*

J. W. MOFFITT, *Assistant Examiner.*